Dec. 28, 1954

H. F. SWENSON 2,698,163

BATCH FEEDER FOR LIQUIDS

Filed July 16, 1951

INVENTOR.
Harvey F. Swenson
BY
ATTORNEYS

Dec. 28, 1954        H. F. SWENSON        2,698,163
BATCH FEEDER FOR LIQUIDS
Filed July 16, 1951        2 Sheets-Sheet 2
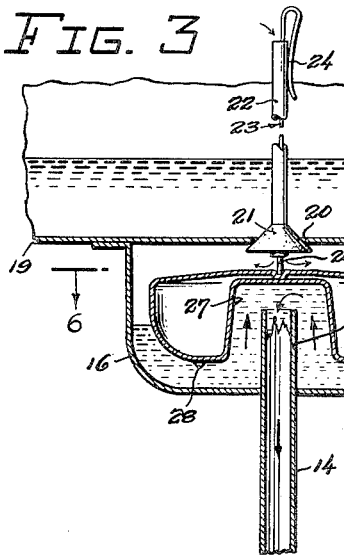
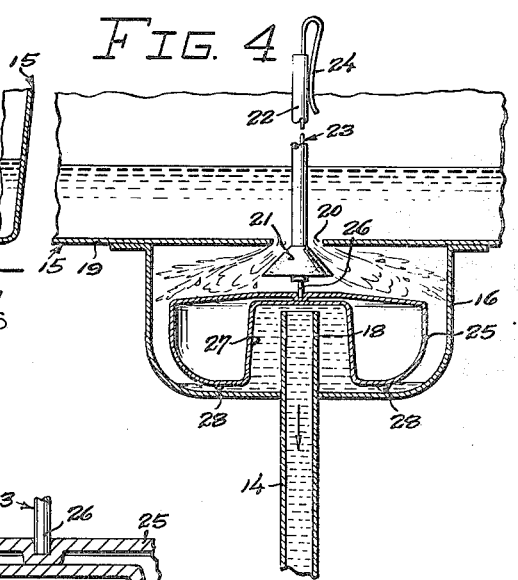
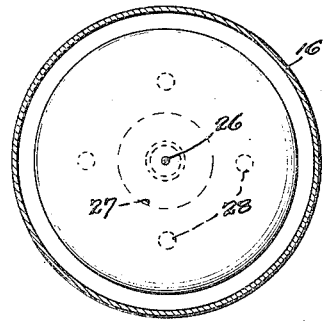
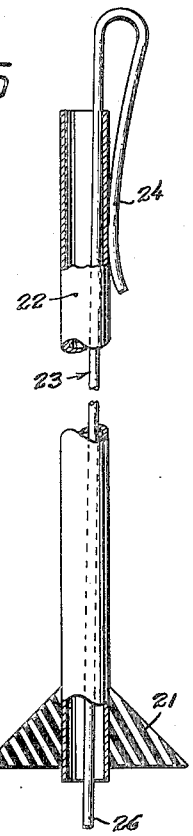
INVENTOR.
Harvey F. Swenson
BY
ATTORNEYS

# United States Patent Office 2,698,163
Patented Dec. 28, 1954

2,698,163

BATCH FEEDER FOR LIQUIDS

Harvey F. Swenson, Seattle, Wash.

Application July 16, 1951, Serial No. 237,021

10 Claims. (Cl. 259—9)

This invention relates to a batch feeder for liquids, and pertains more especially to a batch feeder used in conjunction with a dispensing machine of a type in which liquid is charged to the machine, processed therein, and dispensed as successive calls therefor arise, the quantity of each dispensed portion being relatively uniform. A commercial ice cream freezer of the type which dispenses soft ice cream is an example of a dispensing machine to which the present invention particularly lends itself.

The present invention, for its general object, aims to provide a simple, inexpensive, and yet highly efficient feeder which operates automatically in response to each of a succession of said dispensing operations to replenish the cylinder of the freezer with an augmenting batch of cream mix and, in so doing, to supply a batch corresponding in point of its measure to the amount of conditioned mix, less air which has been whipped into the same, which is dispensed from the cylinder. It is a further and important object to devise a batch feeder of this nature which, in addition to its replenishing of the cream mix, coincidently supplies the cylinder of the freezer with a volume of replenishing air approximately corresponding to the amount of air which is contained in the dispensed serving.

Other more particular objects and advantages of the invention will, with the foregoing general objects, appear and be understood in the course of the following description and claims, the invention consisting in the method of replenishing dispensed fluids and in the novel construction, adaptation and combination of parts hereinafter described and claimed.

In the accompanying drawings:

Figs. 3 and 4 are views taken on the same section line as Fig. 2 and portraying successive stages of a feeding operation.

Fig. 5 is a fragmentary enlarged-scale view detailing valve structure shown in the preceding views.

Fig. 6 is a horizontal sectional view on line 6—6 of Fig. 3; and

Fig. 7 is a fragmentary enlarged-scale sectional view of the float and associated valve-closing lift-rod employed in the present invention.

Figure 1:
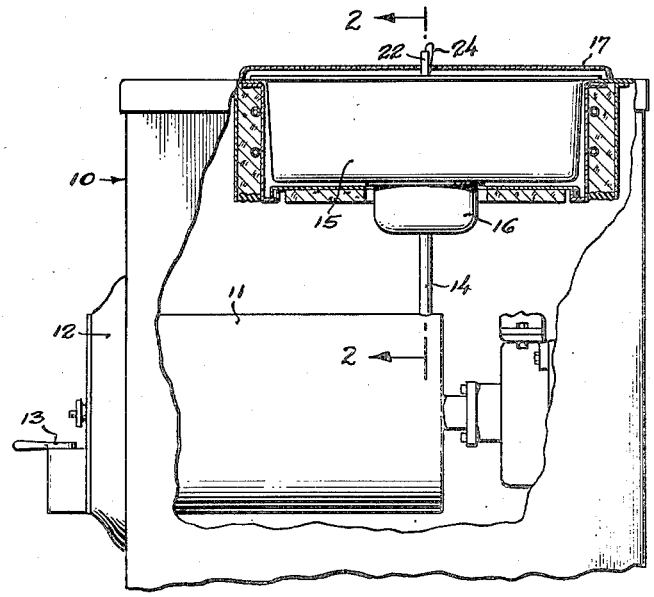
Figure 1 is a view partly in elevation and partly in section illustrating a commercial ice cream freezer shown associated with a batch feeder constructed to embody the preferred teachings of the present invention.

The commercial ice-cream freezer which I have elected to illustrate is generally of conventional design, providing a cabinet 10 in which there is housed a horizontally disposed freezing cylinder 11 containing a rotary dasher (not shown), and having as a front for the freezer an exposed head 12 fitted with a dispensing valve 13. In the present illustration the valve is shown as being of the manually-operable type illustrated and described in my pending patent application filed March 31, 1951, Ser. No. 218,674. There are two procedures followed in the operation of freezers of this nature. One is to fully charge the cylinder, and after conditioning such charge allow the conditioned contents to be completely dispensed before introducing another full charge of fresh mix into the freezing cylinder. The objection to this procedure perforce lies in the fact that the concerned establishment must of necessity have two or more machines for each flavor of ice cream offered for sale, dispensing from one machine while mix is being conditioned in the other so that there will be at all times a supply of conditioned ice cream available for serving. The other and now generally preferred procedure is to introduce augmenting smaller batches of mix to the cylinder as a replacement for each individual serving dispensed, conditioning and admixing these introduced batches with the previously conditioned contents, and thus allowing continuous dispensing of ice cream in that the contents of the cylinder remain relatively constant. To properly blend the replenishing mix into the previously conditioned contents of the cylinder, the mix should be delivered into the cylinder at a point remote to the dispensing valve, and the present invention follows the usual practice of introducing the replenishing mix by gravity through a feed pipe located at the extreme rear end of the cylinder. Such feed pipe is designated by 14.

My perfected batch feeder employs separated upper and lower tanks 15 and 16, respectively, serving in the instance of the upper tank as a reservoir and in the instance of the lower tank as a metering well, and it is by these terms that they will be hereinafter referred to. The reservoir is an open-top receptacle fitted with a removable centrally apertured cover 17, and the metering well is hung from the bottom wall 19 thereof and has the head or ingress end 18 of the feed pipe 14 projecting upwardly into its interior. An opening 20 provided in said bottom wall of the reservoir and aligned vertically with the feed pipe 14 serves as an ingress port connecting the reservoir with the metering well, and provided for this port is a cone-shaped valve 21 which closes from below. This valve is desirably made of soft rubber and is fixedly carried upon the lower end of a stem 22. The opening in the cover 17 is also vertically aligned with the port, and the upstanding stem has a length sufficient to protrude by its upper end through said cover opening. The stem is hollow and open at both ends, and received therein with its ends projecting top and bottom is a rod 23. The upper projecting end of the rod is bent upon itself so as to form a clip 24 spring-tensioned in a degree sufficient to establish a firm frictional grip upon the side wall of the stem. This spring clip provides a simple arrangement permitting the rod to be set in selected longitudinally adjusted positions relative to the stem but it is self-evident that a screw or other positive form of adjustment could be used in lieu of the friction grip. It will be noted that the inside diameter of the stem exceeds the diameter of the rod, thus giving access for free passage of atmospheric air into the metering well.

Used in association with the valve and housed within the metering well is a float 25, preferably of circular plan configuration and having in its top wall a centrally placed socket in which the projecting lower end 26 of the rod is loosely stepped. Said float, upon its underside, presents a centrally placed domed chamber 27. Annular in shape, said chamber has a diameter larger than the feed pipe 14 and has a depth exceeding the length of that portion of the pipe which is exposed within the well. A plurality of circumferentially spaced foot appendages 28, four being shown, project below the float proper and operate when the float is depressed to hold the bottom wall of the float slightly elevated off the floor of the well.

Before tracing the operation, it is here to be noted that while the well-forming tank and the reservoir are shown as being integrally connected this is for purposes of simplifying the illustration. In actual practice the well is so connected to the reservoir as to admit of being easily detached therefrom, thus making the interior of the well and the float which is contained therein readily accessible for purposes of cleaning. Sanitary standards require that all parts of the machine with which the cream mix comes in contact be thoroughly cleaned at the close of each business day.

Now proceeding to describe the operation, let it be assumed that the reservoir, metering well, and freezing cylinder are each empty. At the start of a day's run the operator dumps into the reservoir a sufficient quantity of mix to fully charge the freezing cylinder and then by pushing downwardly upon the rod 23 holds the valve 21 depressed until this charge traverses the metering well and enters the freezing cylinder. As the trailing portion of the flowing liquid reaches the metering well and falls to the low level of the depressed float the following air works under the float and rises to the domed ceiling of the chamber to break the vacuum, whereupon the liquid levels off within the metering well. The reservoir is now filled with a supply of replenishing mix and the feeder is ready for automatic operation. Very nearly all of the commercial ice cream freezers now being produced are automatic in the sense that the freezing operation, once started by the closing of a master switch, continues until the mix contained within the cylinder reaches the proper consistency for serving, whereupon the freezing operation terminates and again starts as the temperature rises above a predetermined point. The dasher contained within the freezing cylinder is of a type which operates to push the mix toward the dispensing end of the freezer, and it is the preferred practice to so co-ordinate the dasher with the dispensing valve that the dasher, while it admits of being operated independently of the dispensing valve, is also caused to turn in concert with an opening of the dispensing valve. This perforce serves the desired end of discharging the conditioned ice cream by force of the dasher's thrust pressure, and it will be apparent that as each of a succession of servings are dispensed from the front end of the freezing cylinder a vacuum condition will be created at the rear end of the cylinder. The present invention utilizes this vacuum condition to automatically replenish the freezing cylinder with a sufficient quantity of air-and-mix to replace the serving which is being dispensed.

Figure 2:
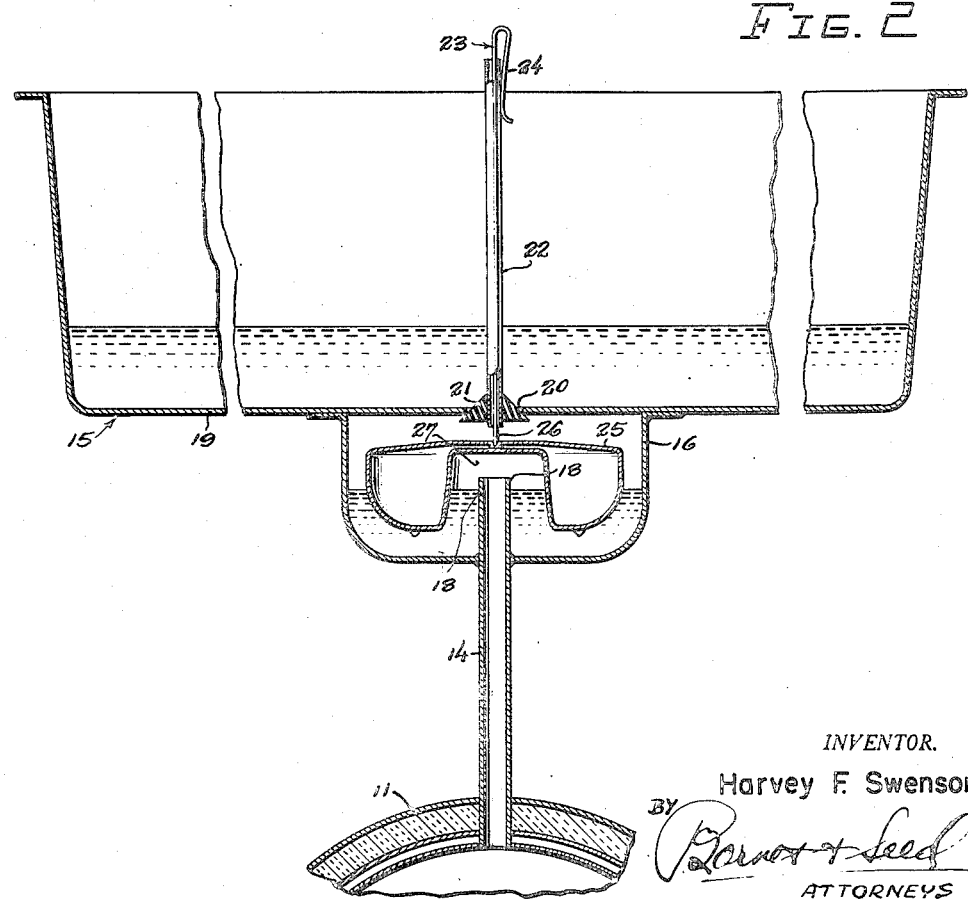
Fig. 2 is a fragmentary transverse vertical sectional view drawn to an enlarged scale on line 2—2 of Fig. 1, incorporating a showing of the liquid which is to be fed and illustrating the parts in position preparatory to feeding a batch of air and mix into the freezing cylinder of the freezer.

Particularly describing the action, it will be seen from an inspection of Fig. 2 that there is a volume of atmospheric air contained in the feed pipe 14 and in the dome of the float-chamber 27. As the ice cream is dispensed such air is sucked into the freezing cylinder to partially fill the void which the dispensing action has created therein. The resulting low-pressure condition within the pipe raises the liquid level within the chamber 27 and this liquid then siphons into the feed pipe, as portrayed in Fig. 3. As the siphoning action proceeds the float drops and progressively opens the valve 21, allowing fresh mix to enter the metering well. It is important that the feed pipe and the ingress port be so dimensioned that the former has a rate of flow exceeding that of the latter wherefor it develops that the liquid level within the metering well continues to drop until the float rests upon the floor and atmospheric air works under the float and rises through the uptake leg of the siphon to break the vacuum, whereupon the siphoning action stops, the liquid levels off, and the float responsively rises to again close off the ingress port. The operation is repeated as each successive serving is dispensed. It will be readily understood that axial adjustment of the rod 23 governs the permissible vertical travel of the float, and thus regulates the amount of mix discharged from the well in each of a succession of siphoning actions.

From this foregoing detailed description of my now preferred illustrated embodiment, the invention and the manner of operation are thought to be clear, and it will be apparent that I have provided a device which not only operates to charge the freezing cylinder with replenishing mix automatically in response to each of a succession of dispensing operations but at the same time charges air into the cylinder to provide the "over-run" necessary for a profitable operation as well as giving to the dispensed product the whipped consistency which is responsible for the wide popularity of soft ice creams.

It is my intention that no limitations be implied and that the hereto annexed claims be given a scope fully commensurate with the broadest interpretation to which the employed language admits.

What I claim, is:

1. In combination with a closed dispensing cylinder in which liquid is processed and portions thereof intermittently dispensed, an overhead batch feeder therefor comprising a reservoir for the liquid, a metering well occupying a position subjacent to the reservoir, a gravity-flow connection from the reservoir to the metering well, uptake and downflow components of an inverted siphon leading from the metering well to the cylinder, and vertically movable normally inactive means contained in said metering well and activated automatically, by the lowering of the pressure within the cylinder as a part of the contents are expelled in response to each of a succession of dispensing operations, to siphon a charge of replenishing liquid from the metering well into the supply pipe and as a replacement for the siphoned charge recharging the well with a like volume of liquid from the reservoir.

2. In combination with a closed dispensing cylinder in which liquid is processed and portions thereof intermittently dispensed, an overhead batch feeder therefor comprising a reservoir for the liquid, a metering well so formed as to trap a charge of liquid therein and occupying a position below the reservoir, a gravity-flow connection from the reservoir to the metering well, a normally closed valve for said connection, a gravity-flow connection from the metering well to the cylinder, means contained in the well serving with the last-named connection to provide the uptake and down-flow components, respectively, of an inverted siphon which, by a lowering of the pressure within the cylinder reflecting the dispensing of a portion of the contents therefrom, is caused to be activated automatically by each of a succession of said dispensing operations so as to responsively siphon into the cylinder the charge of liquid trapped in the metering well, and valve-controlling means operatively interconnected with the means last recited activated automatically by each of a succession of said siphoning actions and serving to open the valve for a momentary interval sufficient to re-charge the well from the reservoir.

3. A batch feeder for use with a dispensing cylinder in which liquid is processed and portions thereof intermittently dispensed, comprising a reservoir for the liquid, a metering well constantly exposed to the atmosphere and located below the reservoir, a gravity-flow inlet connection from the reservoir to the well, a closure valve for said connection, a discharge pipe feeding by gravity to the cylinder and having its intake end projecting upwardly above the floor of the well into the interior of the latter, a bell-shaped cap loosely investing said intake end of the feed pipe and serving therewith to define an inverted siphon, the siphoning action being started automatically as each of a succession of intermittently performed dispensing operations creates a vacuum condition within the cap, and means causing said closure valve to open and close automatically as the liquid within the well falls below and rises to a predetermined level between the lower end of the cap and the upper end of the discharge pipe, the rate of the siphoning flow exceeding the rate at which the well is recharged from the reservoir so that the level of the liquid within the well progressively drops until atmospheric air present within the well rises through the uptake leg of the siphon to terminate the siphoning action.

4. A batch feeder for use with a dispensing cylinder in which liquid is processed and portions thereof intermittently dispensed, comprising a reservoir for the liquid, a metering well constantly exposed to the atmosphere and located below the reservoir, a gravity-flow inlet connection from the reservoir to the well, a closure valve therefor, a discharge pipe feeding by gravity to the cylinder and having its intake end projecting upwardly above the floor of the well into the interior of the latter, a bell-shaped float received in the well with its domed chamber loosely investing said intake end of the feed pipe and acting with the latter to form the uptake and downflow legs of an inverted siphon, and operative interconnection between the float and the valve causing the valve to close and open, respectively, in concert with a rise and fall of the float, the flow capacity of the siphon exceeding that of the valved inlet connection, the siphoning action being started automatically by each of said intermittently performed dispensing operations.

5. A batch feeder for use with a dispensing cylinder in which liquid is processed and portions thereof intermittently dispensed, comprising a reservoir for the liquid, a metering well constantly exposed to the atmosphere and located below the reservoir, a gravity-flow connection from the reservoir to the well, a closure valve for said connection, a discharge pipe feeding by gravity to the cylinder and having its intake end projecting upwardly above the floor of the well into the interior of the latter, a bell-shaped float received in the well with its domed chamber loosely investing said intake end of the feed pipe and acting with the latter to form the uptake and downflow legs of an inverted siphon, operative interconnection between the float and the valve causing the valve to open as the float falls and to close as the float rises, and adjustable means for regulating the degree to which said valve opens in response to said falling movement of the float, the siphon having a flow capacity exceeding that which is provided by the gravity-flow connection as the valve opens by falling movement of the float.

6. In a commercial ice cream freezer, in combination, a freezing cylinder having a rotary dasher therein and provided at one end with an inlet opening through which cream mix and air are charged to the cylinder and provided at the other end with a valved delivery opening through which individual servings of ice cream processed within said cylinder from the introduced charges are intermittently dispensed, a reservoir for the mix supported in elevated relation above the cylinder, a metering well hung from the bottom wall of said reservoir, said bottom wall of the reservoir providing a discharge opening establishing communication from the reservoir to the well, a feed pipe leading by gravity to the inlet opening of the cylinder and having its intake end projecting upwardly above the floor of the well into the interior of the latter, a bell-shaped cap loosely investing said intake end of the feed pipe and serving therewith to define an inverted siphon, the creation of a vacuum condition within the cylinder by each of a succession of intermittently performed dispensing operations acting to initiate a siphoning action by first drawing into the cylinder the air choking the apex of the siphon, a cone-shaped valve closing from below against said discharge opening, a hollow open-ended stem for said valve extending upwardly through the reservoir with its upper end projecting above the level of the mix contained in the reservoir and serving to constantly supply air to the interior of the well, and means causing said closure valve to open and close automatically as the mix within the well falls below and rises to a predetermined level, the rate of the siphoning flow exceeding the rate at which the well is re-charged with mix from the reservoir.

7. In a commercial ice cream freezer, in combination: a freezing cylinder having a rotary dasher therein and provided at one end with an inlet opening through which cream mix and air are charged to the cylinder and provided at the other end with a valved delivery opening for intermittently dispensing individual servings of ice cream processed within the cylinder from said introduced charges, a reservoir for the mix supported in elevated relation above the cylinder, a metering well hung from the bottom wall of said reservoir, said bottom wall of the reservoir providing a discharge opening establishing communication from the reservoir to the well, a feed pipe leading by gravity to the inlet opening of the cylinder and having its intake end projecting upwardly above the floor of the well into the interior of the latter, a cone-shaped valve closing from below against said discharge opening, a hollow open-ended stem for said valve extending upwardly through the reservoir with its top opening exposed to the atmosphere and its bottom opening exposed to the interior of the well, a bell-shaped float received in the well with its domed chamber loosely investing said intake end of the feed pipe and acting with the latter to define an inverted siphon, the creation of a vacuum condition within the cylinder by each of a succession of intermittently performed dispensing operations acting to initiate a siphoning action by drawing into the cylinder the air choking the apex of the siphon, and operative interconnection between the float and the stem causing said closure valve to open and close automatically as the mix within the well falls below and rises to a predetermined level, the rate of the siphoning flow exceeding the rate at which the well is re-charged with mix from the reservoir.

8. The freezer structure of claim 7 in which the discharge opening and the intake end of the feed pipe are vertically aligned, thus placing the float co-axial to the valve stem, and wherein said operative interconnection between the float and the stem comprises a thrust rod received within the hollow center of the stem with its lower end exposed and footing upon the float and having its upper end so connected to the stem as to admit of being set in axially adjusted position relative thereto.

9. Structure according to claim 8 wherein, to provide said adjustable connection, the upper end of the rod is bent back upon itself to form a spring clip acting to frictionally grip the stem.

10. In combination with a closed dispensing cylinder in which liquid is processed and portions thereof intermittently dispensed, an overhead batch feeder therefor comprising a reservoir for the liquid, a metering well occupying a position subjacent to the reservoir, a gravity-flow connection from the reservoir but above the cylinder to the metering well, uptake and downflow components of an inverted siphon leading from the metering well to the cylinder, and means activated automatically by the lowered pressure in the cylinder which occurs as each of a succession of dispensing operations are performed causing (1) a replenishing charge of the liquid to be siphoned from said metering well into the cylinder and (2) a like volume of liquid to be fed from the reservoir to the metering well as a replacement for said charge.

References Cited in the file of this patent

UNITED STATES PATENTS

| Number | Name | Date |
| --- | --- | --- |
| 749,286 | Gerner | Jan. 12, 1904 |
| 1,144,525 | Blake | June 29, 1915 |
| 1,160,735 | Lowry | Nov. 16, 1915 |
| 1,504,756 | Hammill | Aug. 12, 1924 |
| 2,461,334 | Major | Feb. 8, 1949 |
| 2,515,722 | Maranz | July 18, 1950 |